United States Patent
Chavarria et al.

[15] 3,686,687
[45] Aug. 22, 1972

[54] DOUBLE-ACTING HYDRAULIC PUMP

[72] Inventors: Melchor Julio Chavarria; Osvaldo Risso, both of Hipolito Irigoyen 615, Buenos Aires, Argentina

[22] Filed: Sept. 10, 1970

[21] Appl. No.: 71,156

[30] Foreign Application Priority Data

Jan. 30, 1970  Argentina..................226715

[52] U.S. Cl..............................417/223, 417/223
[51] Int. Cl.......................................F04b 49/00
[58] Field of Search..................417/223, 534–537; 74/45

[56] References Cited

UNITED STATES PATENTS

| | | | |
|---|---|---|---|
| 1,116,998 | 11/1914 | Compton | 417/223 |
| 1,183,496 | 5/1916 | Runge | 417/223 |
| 1,221,295 | 4/1917 | Dopkins | 417/223 |
| 1,450,085 | 3/1923 | Jedlitschka | 417/223 |
| 1,993,583 | 3/1935 | Arena | 417/223 |
| 2,055,396 | 9/1936 | Voxall | 74/45 |
| 2,827,613 | 3/1958 | Robison | 74/45 |

FOREIGN PATENTS OR APPLICATIONS

| | | | |
|---|---|---|---|
| 167,335 | 8/1921 | Great Britain | 417/223 |
| 936,514 | 7/1948 | France | 74/45 |
| 1,098,334 | 3/1955 | France | 417/534 |

*Primary Examiner*—William L. Freeh
*Attorney*—Ernest G. Montague

[57] ABSTRACT

A hydraulic double-acting pump of the piston type connected by conduits to a source of supply of liquid and a consuming source, comprising a double-acting piston displaceably housed in a cylinder to which the liquid has access from the source of supply and the ends of which communicate with the consuming source, an actuating means for the piston comprising a double-forked oscillating level in one of the forks of which displaceably houses a rod rigidly connected with the piston emerging from the cylinder through a longitudinal groove therein while the other fork houses displaceably a rod of a crank rigidly connected with a rotary shaft, connected with a driving pulley via clutch means, and automatically actuated by pressure of the liquid pumped and by an opposing spring, the pulley operatively connected to a drive motor.

2 Claims, 10 Drawing Figures

INVENTORS
MELCHOR JULIO CHAVARRIA
OSVALDO RISSO
BY
ATTORNEY.

Patented Aug. 22, 1972

INVENTORS
MELCHOR JULIO CHAVARRIA
OSVALDO RISSO
BY
ATTORNEY.

INVENTORS
MELCHOR JULIO CHAVARRIA
OSVALDO RISSO
BY
ATTORNEY.

DOUBLE-ACTING HYDRAULIC PUMP

The present invention relates to double-acting hydraulic pumps.

It is an object of the present patent to provide a novel double-acting hydraulic pump.

More specifically, the present invention provides a driving hydraulic pump of the piston type in which the piston is double-acting, that is, it effects drive in both directions of its stroke.

This arrangement provides a substantially larger flow as compared with the power of the pump which, furthermore, has been designed in an extremely simple manner which results in a reduced cost of production and substantial simplification in maintenance.

It is another object of the present invention to provide a double-acting hydraulic pump comprising a cylinder connected at one part to the source of supply of the liquid and at its ends to the source of consumption and within which there axially moves a double-acting piston driven by a double forked oscillating lever, one of the forks of which surrounds a lateral rod rigidly connected with the piston and the other, the rod of a crank connected to the driving means of the pump, and a driving means is provided preferably controlled, for the stopping and placing in operation thereof, by the liquid pump itself and in semi-automatic relationship with the demand.

With these and other objects in view which will become apparent from the following detailed description, the present invention will become apparent in conjunction with the accompanying drawings in which.

Figure 1:
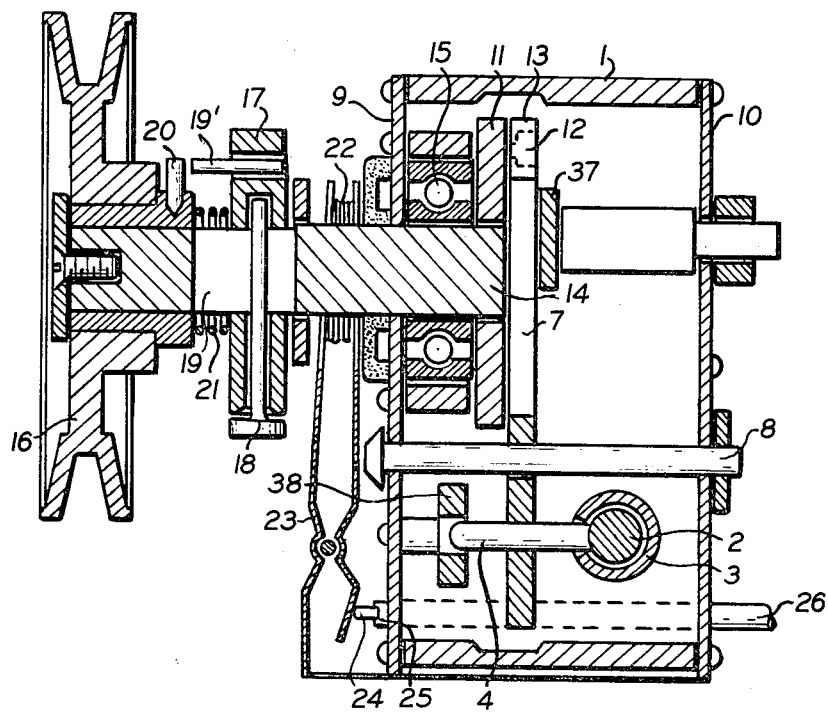
FIG. 1 is a longitudinal vertical section through a pump in accordance with the present invention, in its most elemental design and in which the pump itself constitutes the tank for the liquid to be pumped.
Figure 2:
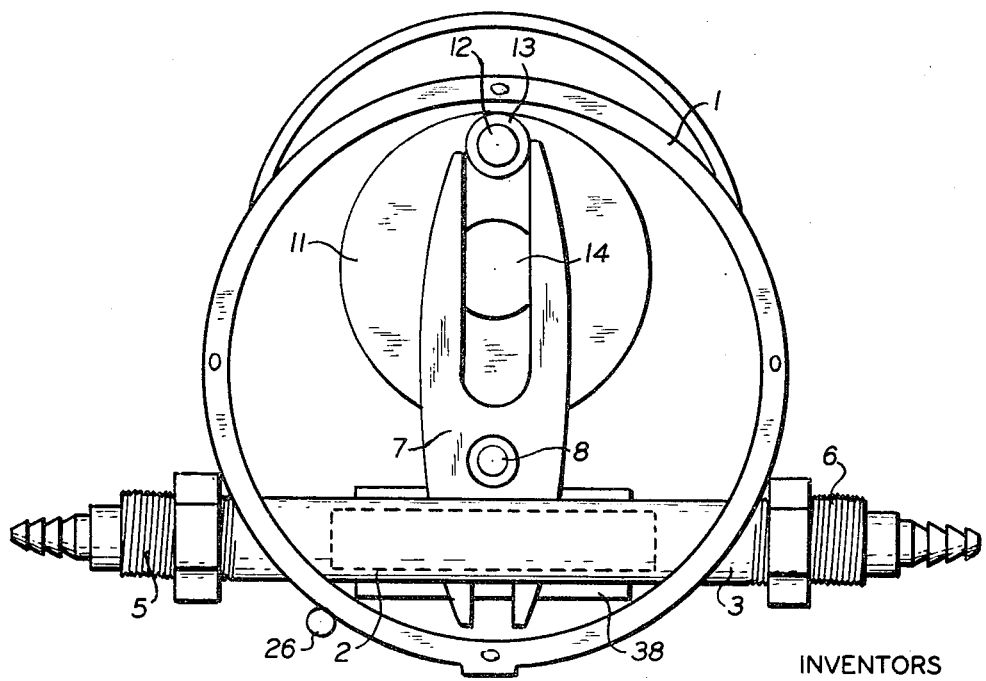
FIG. 2 is rear elevation of the same pump with the rear cover removed from the housing.
Figure 3:
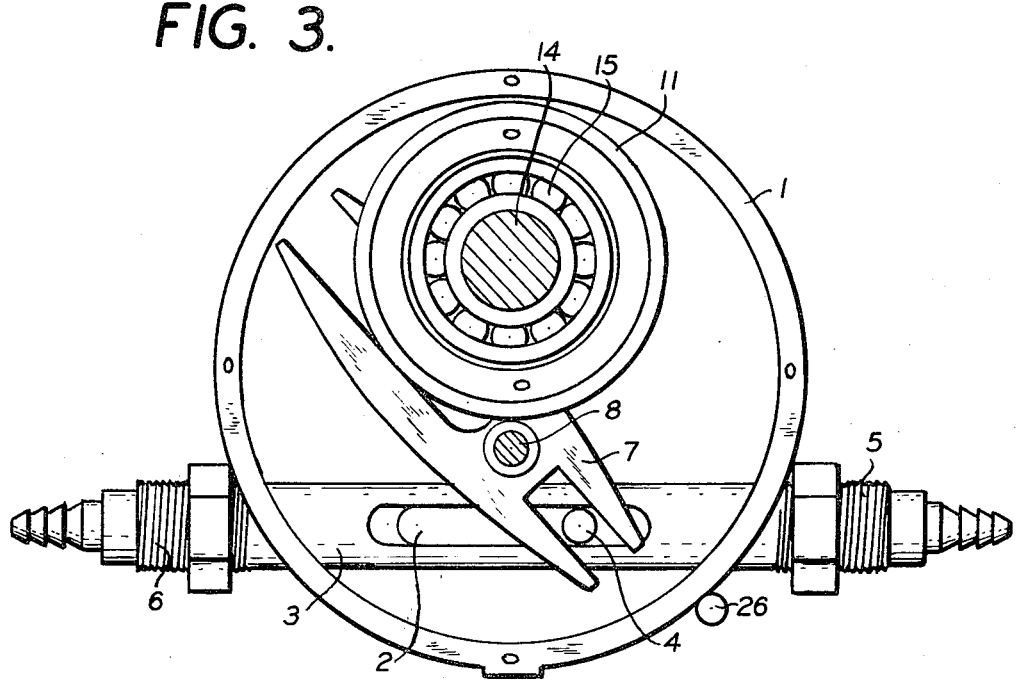
FIG. 3 is a front view of the pump of FIG. 1.

In all the figures, the same reference numbers correspond to the same component parts. Referring now to the drawings, and more particularly to FIGS. 1, 2 and 3, a double-acting hydraulic pump designed in accordance with the present invention comprises a housing which forms the tank for the fluid to be pumped and within which the pumping elements are located. The elements comprise a double-acting drive piston 2, axially displaceably housed in a cylinder 3 to which the liquid to be pumped has access, and the ends 5 and 6 of which are in communication with the consuming source.

From the piston 2, there extends laterally a rigidly connected rod 4 which emerges from the cylinder 3 through a longitudinal groove provided for this purpose and is displaceably housed within the lower fork of a double forked lever 7 pivoting on a shaft 8 secured at its ends to two covers 9 and 10 of the housing.

The lever 7 is actuated, pivoting on the shaft 8, by a crank 11 the rod 12 of which moves, upon rotation, within the upper fork of the lever 7, causing its oscillating movement which is transmitted by the lower fork to the rod 4 and finally to the piston 2. The crank 11 in its turn is rigidly connected with a shaft 14 mounted on ball bearings 15 in the front cover 9 of the housing 1 and is connected to the drive means of the pump.

Figure 4A:
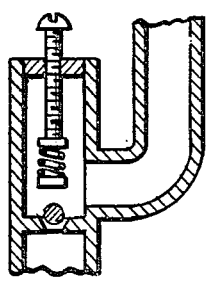
FIGS. 4a and 4b are longitudinal sectional views showing two check valves of FIG. 4.
Figure 4:
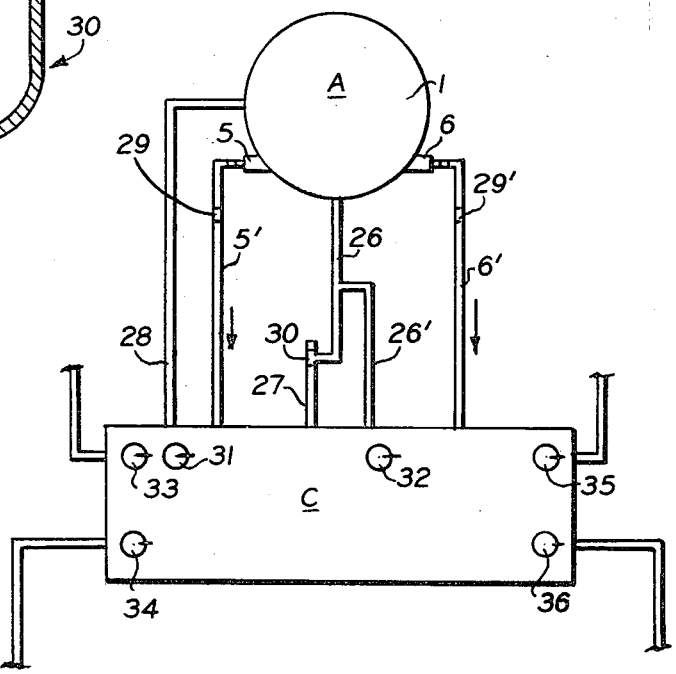
FIG. 4 is a flow diagram of the liquid, with two detailed views, of the check valves.
Figure 4B:
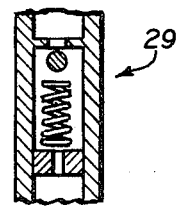

The drive means comprises a pulley 16, freely rotatable on the free end of the shaft 14 and connected to a device for coupling therewith comprising a disc 17 coaxial with the shaft 14 and rotatable together therewith, but coaxial displaceable with respect thereto, due to the blind screw 18 threaded to the disc 17 and freely passing in a central longitudinal groove 19 of the shaft 14 in which it is housed. A pin 19' perpendicularly projects from the disc 17, which pin 19' is capable of engaging a second pin 20 depending on the position of the disc 17 which is urged by the cooperative pushing to two opposing expansion springs 21 and 22, the latter being compressible by the action of a scissors 23 connected to a piston 24 housed in a cylinder 25 in communication with the liquid pumped via a conduit 26 as shown in FIG. 4. FIG. 4 schematically illustrates the hydraulic circuit together with the corresponding valves which supplement it. The spring 22 is of a tension greater than that of its corresponding spring 21.

The pulley 16 is driven by a special motor by means of a relevent belt.

Referring now to FIG. 4, the source of supply A of the liquid comprises the tank and the pump. The consuming source C is, in this case, a distribution box with four branches. As may be noted from FIG. 4, the pump liquid enters the box C through conduits 5' and 6' after passing through separate check valves 29 and 29' and is distributed there as desired by means of passage valves 33, 34, 35 and 36. When the pressure in the box C exceeds the limits stipulated, either because of a decrease or stopping of the demand, or for any other reason, the excess liquid flows through conduit 27 and overcoming the opposition of an adjustable safety valve 30 enters conduit 26 and stops the operation of the pump as will be seen further below in the description of the operation of the device.

The excess liquid can be returned to the tank A through conduit 28 actuating valve 31. The purpose of the valve 32 is to permit the discharge of the conduit 26 returning the liquid which is introduced under pressure therein, to the box C through the branch 26'.

The operation of the device takes place in the following manner, referring to FIGS. 1 to 4.

Once the valve 30 has been set to the desired pressure and the driving motor for the pulley 16 has been placed in operation, there being no liquid pressure in the conduit 26, the spring 22, overcoming the force of the cooperating spring 21, will cause the pins 19' and 20 to come into engagement with each other and will thereby actuate the driving of the shaft 14, which carries along with it the crank 11 which, upon rotating, swings the lever 7 on its shaft 8 thereby driving the piston 2 in reciprocating movement within the cylinder 3, which will result in sending of liquid under pressure via the openings 5 and 6 through the conduits 5' and 6' to the distribution box C.

When the pressure in the box C exceeds the stipulated or predetermined limits, after adjustment of the valve 30, the liquid pump will have access to the conduit 26 and drives the piston 24 to cause the scissors 23 to compress the spring 22 allowing the mating spring 21 to expand freely. The latter then displaces the disc 17, freeing the pin 19' from its contact with its mating pin 20, and stopping the pumping drive.

The box C is then drained through the conduit 28 by means of the valve 31, and the rear opening of the valve 32 permits the draining of the conduit 26 for the placing again in operation of the pump by action of the spring 22 which, free of the pressure of the scissors 23, will overcome the tension of the spring 21 and displace the discs 17 to cause a re-engagement of the pins 19' and 20.

It should be added that the plate 37 (FIG. 1) secured to cover 10 of the housing has the object of maintaining the lever 7 in the operative position, in the same way as the plate 38 connected to the opposite cover and grooved centrally and parallel to the cylinder 3 acts as guide means for the displacement of the rod 4.

Figure 5:
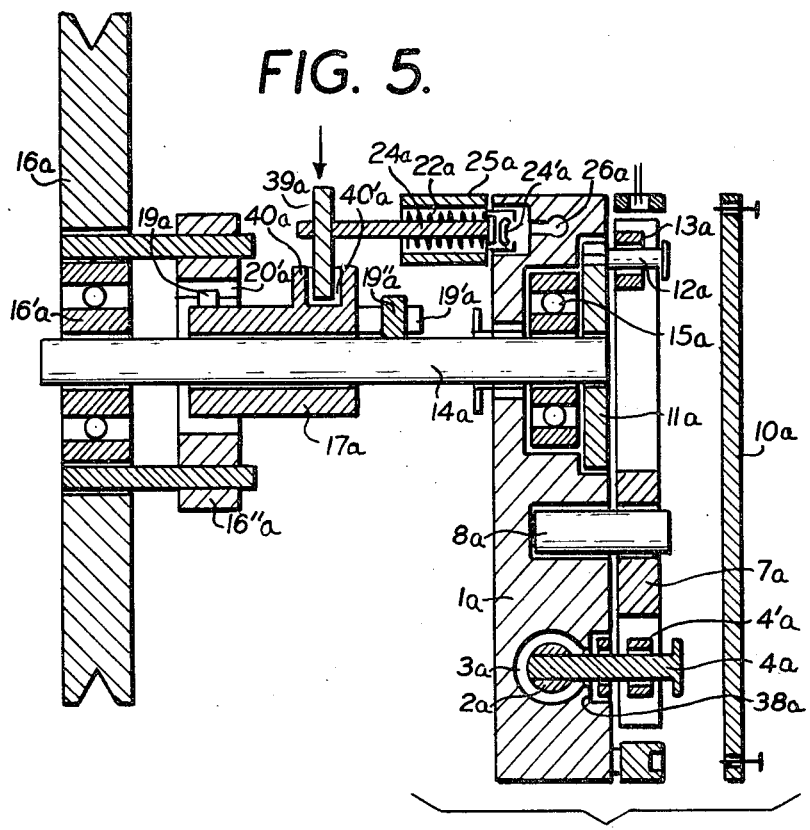
FIG. 5 is a longitudinal vertical section, of a similar pump in a preferred design which does not include within its housing the source of supply of the liquid.
Figure 6:
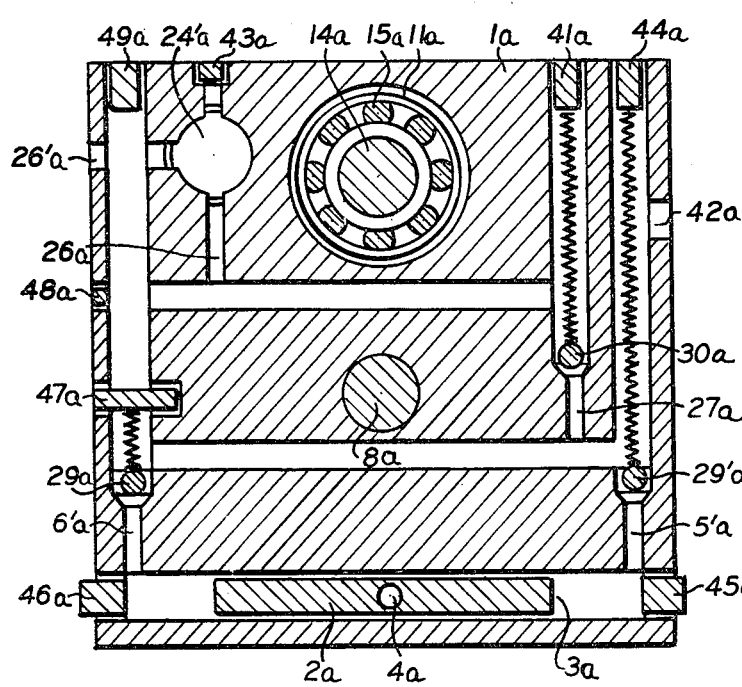
FIG. 6 is a cross-section in elevation of the embodiment of FIG. 5 seen from the rear.

Referring now again to the drawings, and more particularly to FIGS. 5 and 6, there is illustrated a preferred embodiment of a pump in accordance with the present invention, in a more advanced version in which the pump does not constitute the fuel tank, to which it is connected by a conduit for this purpose, but includes on the other hand, in the body of the pump, conduits for the discharge of the actuated liquid and for the actuating of the clutch with the corresponding check valves and safety valves.

This embodiment furthermore provides a new simplified concept for the operating arrangement of the clutch which is of the direct action type with elimination of one of the springs and the scissors.

The concept not only substantially simplifies the device but results in a considerable reduction in its size, greatly facilitating the installation thereof in a very small space and with a correlative decrease in its weight, with all the advantages inherent in such characteristics, and which it is not necessary to enumerate.

In these figures, despite a structure substantially different from the embodiment previously described and illustrated in FIGS. 1 to 3, in order to facilitate understanding and since there is disclosed as embodiment based on the same inventive concept and entirely similar, as may be noted, use has been made of the same reference numbers, but with "a" subscripts, as in the preceding figures to identify the similar parts.

Thus, referring now to FIG. 5, a pump body 1a is provided to which there are rotatably articulated shafts 8a and 14a. The double forked oscillating lever 7a is pivotally mounted on shafts. The pulley turns on shaft 14a on bearings 16'a and a disc 16a is securely fastened thereto, which disc is provided with radial grooves 20a. At the same time, on the shaft 14a there is axially displaceably mounted a bushing 17a provided with a radial lateral lug 40a thinned at the center 40'a in which there engages a key 39a, rigidly connected with the piston 24a by means of a screw 39'a. The piston 24a moves within the cylinder 25a and is acted on, in opposite directions, by the pumped liquid which enters through the conduit 26a and by an expansion spring 22a. A cup 24'a channels the thrust of the liquid.

A flange 19a of the bushing 17a is adapted to engage in the grooves 20'a and a pin 19'a longitudinally projecting from same engages with its counterpart 19''a which is radially secured to the shaft 14a.

The arrangement of the lever 7a of the crank 11a, of the rod 12a and of the double-acting piston 4a are similar to the same parts of the embodiment shown in FIGS. 1 to 3 with the only difference that the cylinder 3a is provided in the pump body 1a and that the rod 4a has been provided with a rotary bushing 4'a to facilitate its displacement in the lower fork of the lever 7a. The cover 10a acts by itself as guide and support for the previously indicated parts.

FIG. 6 is a cross-section view from which there can be noted the location of the shafts 8a and 14a and of the piston 2a and the shape of the channels 5'a, 6'a, 26a and 27a, provided in the pump body itself, which also contains, as can be seen, the check valves 29a, 29'a and 30a, the location of the cup 24'a in an end widening of the channel 26a being evident. A lateral channel 26'a permits the possible drainage of the channel 26a by the operation of a passage valve (not shown). A second lateral channel forms the outlet mouth towards the consuming source.

A screw 41a makes it possible to regulate the tension of the valve 30a. The plugs 43a to 49a are simple closure plugs.

The operation takes place as follows, referring to both FIGS. 5 and 6:

Once the channel 26a has been drained and the pulley 16a placed in operation, the bushing 17a will be displaced towards the right by the action of the spring 22a, whereby the flanges 19a or 19'a of the bushing will engage respectively with one of the grooves 20'a and with the pin 19''a transmitting the rotary movement of the pulley 16a to the shaft 14a and via the latter to the crank 11a, the lever 7a and the piston 2a in the manner which has been previously described.

In this way, the liquid which arrives at the cylinder 3a from the source of supply is driven by the piston 2a through the channels 5'a and 6'a and, overcoming the resistance of the valves 29a and 29'a and not that of the valve 30a, emerges toward the consuming source through the channel 42a.

Figure 5A:
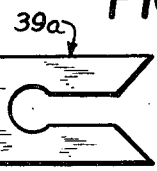
FIGS. 5a and 5b are further detailed views of the control device.
Figure 5B:
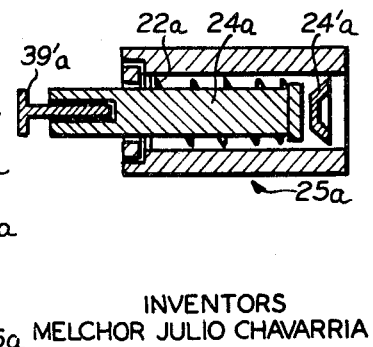

When the pressure increases sufficiently, for the reasons already set forth, it overcomes the resistance of the valve 30a and, via the channel 36a, pushes the cup 24'a (FIG. 5b) and therefore the piston 24a overcoming the tension of the spring 22a whereby, via the key 39a (FIG. 5a) and the flange 40a, it pushes the bushing 17a towards the left, freeing the shaft 14a from clutch engagement with respect to the pulley 16a and thereby stopping the pumping drive.

The subsequent draining of the channel 26a by action of the operator in the manner already indicated will make it possible to recommence the pumping, the cycle being repeated.

As is clear from what has been described and shown this embodiment offers gentle, even operation in a manner which is furthermore simple and efficient.

While we have disclosed several embodiments of the present invention, it is to be understood that these embodiments are given by example only and not in a limiting sense, the scope of the present invention being determined by the objects and the claims.

We claim:

1. A hydraulic double-acting pump of the piston type connected by outlet conduits to a source of supply of liquid and a consuming source, comprising
   - a pump casing housing forming a reservoir for a pump fluid,
   - a cylinder mounted in said housing,
   - a double-acting single piston displaceably mounted in said cylinder,
   - said liquid communicating with both ends of said cylinder,
   - a consuming source connected to the ends of said cylinder,
   - driving means for actuating said single piston comprising a double forked oscillating lever pivotably mounted in said housing and having a slot at each end,
   - a first rod rigidly connected with said piston and slidably displaceably housed in one slot of said lever,
   - said cylinder having a longitudinal groove therein through which said first rod extends,
   - a rectilinear groove means secured to said housing and parallel to said cylinder,
   - said first rod projecting at its extremity into and guided by said rectilinear groove, thereby linearly guiding the piston movement,
   - a rotary shaft,
   - clutch means, including a biasing spring,
   - a driving pulley operatively connected to said rotary shaft by means of said clutch means,
   - a crank rigidly connected to said rotary shaft and including a second driving eccentric rod being displaceably housed in the other slot of said lever,
   - said clutch means being automatically actuated by pressure of the liquid being pumped by said piston and by said biasing spring,
   - said pulley adapted to be driven by a drive motor and
   - a single action valve at the end of each extremity of said cylinder.

2. The pump, as set forth in claim 1, wherein
   - said clutch means comprises a bushing displaceably mounted on said shaft and including means for operative engagement with said driving pulley when said bushing is displaced toward said driving pulley,
   - a check valve disposed in said outlet conduits,
   - a safety conduit connected to said consuming source, and operatively connected to said outlet conduits,
   - a manually actuated discharge valve in said safety conduit,
   - a clutch disengagement piston responsive to said biasing spring and to the pressure of said liquid pump by said double-acting piston and operatively connected to said safety conduit,
   - said bushing operatively connected to said clutch disengagement piston, and
   - the pressure of the liquid is greater than the tension of said biasing spring.

* * * * *